United States Patent
Marchi et al.

(10) Patent No.: US 9,578,985 B2
(45) Date of Patent: Feb. 28, 2017

(54) BEVERAGE PRODUCING UNIT AND MACHINE

(71) Applicant: KONINKLIJKE PHILIPS N.V., Eindhoven (NL)

(72) Inventors: Marco Marchi, Eindhoven (NL); Cesaré Lenzi, Eindhoven (NL); Andrea Pecci, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/424,051

(22) PCT Filed: Sep. 10, 2013

(86) PCT No.: PCT/IB2013/058421
§ 371 (c)(1),
(2) Date: Feb. 26, 2015

(87) PCT Pub. No.: WO2014/041478
PCT Pub. Date: Mar. 20, 2014

(65) Prior Publication Data
US 2015/0223629 A1   Aug. 13, 2015

(30) Foreign Application Priority Data

Sep. 13, 2012  (EP) .................................... 12184208

(51) Int. Cl.
*A47J 31/40*  (2006.01)
*A47J 31/36*  (2006.01)

(52) U.S. Cl.
CPC .......... *A47J 31/405* (2013.01); *A47J 31/3609* (2013.01)

(58) Field of Classification Search
CPC ... A47J 31/405; A47J 31/3609; A47J 31/3614
(Continued)

(56) References Cited

U.S. PATENT DOCUMENTS

| 4,681,028 A | 7/1987 | Schmed |
| 5,964,142 A * | 10/1999 | Tio ...................... A47J 31/3614 |
| | | 99/289 R |
| 2003/0209150 A1 * | 11/2003 | Guindulain Vidondo ................. |
| | | G07F 13/065 |
| | | 99/289 R |

FOREIGN PATENT DOCUMENTS

| EP | 1306041 A1 | 5/2003 |
| EP | 2229849 A1 | 9/2010 |

(Continued)

*Primary Examiner* — David Angwin
*Assistant Examiner* — John J Norton

(57) ABSTRACT

A beverage producing unit includes an infusion chamber with a first infusion chamber portion forming a receptacle for receiving a beverage preparing product and is configured to be movable between a loading position, where the first infusion chamber portion is arranged under a product-loading hopper, and a brewing position, where the first infusion chamber portion is configured to co-act with a second infusion chamber portion to close the infusion chamber. A scraper is arranged and configured to level a product heap projecting from the receptacle during movement of the first infusion chamber portion from the loading position towards said brewing position. The receptacle has a top edge surrounding a receptacle inlet aperture. The top edge is provided with a projection extending from the top edge and configured to prevent product from falling out of the receptacle when passing under the scraper.

12 Claims, 6 Drawing Sheets

(58) Field of Classification Search
USPC .............................................. 99/287, 289 R
See application file for complete search history.

(56) References Cited

FOREIGN PATENT DOCUMENTS

WO  2012001592 A1  1/2012
WO  2012114218 A1  8/2012

* cited by examiner

BEVERAGE PRODUCING UNIT AND MACHINE

This application is the U.S. National Phase application under 35 U.S.C. §371 of International Application No. PCT/IB2013/058421, filed on Sep. 10, 2013, which claims the benefit of International Application No. 12184208.2 filed on Sep. 13, 2012. These applications are hereby incorporated by reference herein.

FIELD OF THE INVENTION

The present disclosure relates to beverage producing machines, in particular but not exclusively coffee producing machines, for preparing espresso coffee or other coffee-based beverages. More specifically, the present disclosure relates to beverage producing units using products in bulk form, for example loose coffee powder obtained by grinding coffee beans and beverage producing machines including said units.

BACKGROUND OF THE INVENTION

Beverage producing devices, such as brewing machines for producing espresso coffee, are well-known in the art. U.S. Pat. No. 4,681,028 discloses a device for the preparation of hot beverages, particularly coffee, comprising a brewing unit including a brewing chamber with a movable first brewing chamber portion and a second brewing chamber portion, designed to co-act one with the other in order to charge coffee powder in the first brewing chamber portion, closing the brewing chamber and brewing coffee by feeding hot pressurized water through the brewing chamber and the coffee powder contained therein, in order to extract the flavors from the coffee powder.

In these known devices the movable brewing chamber portion usually performs a rotary and translation movement in a vertical plane. In a first loading position the movable brewing chamber portion is placed vertically under a charging hopper, through which coffee powder is dispensed from a coffee grinder into a receptacle formed in the first brewing chamber portion. A certain amount of coffee powder or other bulk beverage preparing product is collected inside the receptacle and forms a conical bulk material heap. When the movable brewing chamber portion pivots from the loading position towards the brewing position, the tip of the bulk product heap is flattened by a scraper, so that the height of the heap is reduced by pushing the bulk material towards the base of the conical heap inside the receptacle before closing the brewing chamber, compacting the product and starting the brewing cycle.

In some conditions, part of the product loaded in the receptacle formed in the brewing chamber portion can fall out of the receptacle and soils the interior of the device in which the brewing unit is arranged. Frequent cleaning of the device becomes necessary.

SUMMARY OF THE INVENTION

A beverage producing unit is provided, which alleviates or at least partly overcomes the above mentioned problem, reducing or eliminating the bulk product, e.g. coffee powder, which falls out of the receptacle formed by the brewing chamber during movement from the loading position towards the brewing position.

According to the invention, a beverage producing unit, for example a brewing unit, is provided, comprising an infusion chamber with a movable, first infusion chamber portion forming a receptacle for receiving at least one beverage preparing product, and a second infusion chamber portion. The first infusion chamber portion is movable between a loading or first position, wherein the first infusion chamber portion is arranged under a product-loading hopper, and a brewing or second position, wherein the first infusion chamber portion co-acts with the second infusion chamber portion, thus closing the infusion chamber. The beverage producing unit further comprises a scraper arranged and configured for leveling a bulk product heap, which can project from the receptacle, during movement of the first infusion chamber portion from the first position towards the second position. Furthermore the receptacle has a top edge surrounding a receptacle inlet aperture and provided with a projection extending from the top edge. The projection is arranged for preventing the bulk product from falling out of the receptacle when passing under the scraper. In this manner, soiling of the machine by bulk product, such as coffee powder, accidentally falling from the infusion chamber during the closing movement is prevented or reduced. The projection forms a shield arranged behind the scraper, so that the excess bulk material which otherwise could accidentally fall out of the receptacle, is retained by the shield and maintained inside the infusion chamber.

In practical embodiments, the top edge or edge surrounding the aperture of the receptacle of the infusion chamber has a leading portion and a trailing portion, said leading portion moving ahead of said trailing portion during displacement of said first infusion chamber portion from the loading position towards said brewing position. The projection is arranged along the trailing portion of the top edge.

In a manner known per se, the hopper has a product inlet, a product outlet and a product passage extending downwardly from the product inlet to the product outlet. In advantageous embodiments, the product outlet is surrounded by an outlet edge which comprises two oppositely arranged indentations, aligned along a trajectory of motion of the first infusion chamber portion. The indentations are configured and arranged for allowing the passage of the projection extending from the top edge of the receptacle when the first infusion chamber portion moves under said hopper. This provides better guidance of the product into the receptacle, since less free space or no free space is left between the outlet edge of the hopper and the top or upper edge of the receptacle. At the same time, the indentations prevent collision between the projection and the hopper during closure of the infusion chamber.

In some embodiments the scraper comprises a lower scraping edge and a sliding surface, arranged for co-action with the projection during movement of said first infusion chamber portion from said loading position towards said brewing position. The sliding surface is preferably concave and in particular for example substantially cylindrical for a better leveling effect on the bulk product and optimum co-action with the movable infusion camber portion.

According to a further aspect, the invention also concerns a beverage producing machine comprising a beverage producing unit as described above.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description reference will specifically be made to a coffee producing machine and to a beverage producing unit in the form of a brewing unit comprising a brewing chamber. It shall however be understood that the features disclosed herein can be embodied in a beverage producing machine intended for the preparation of a different beverage, still using bulk ingredients, for example in the form of powder, leafs etc. and including a beverage producing unit with an infusion chamber, different from a brewing unit.

Figure 1:
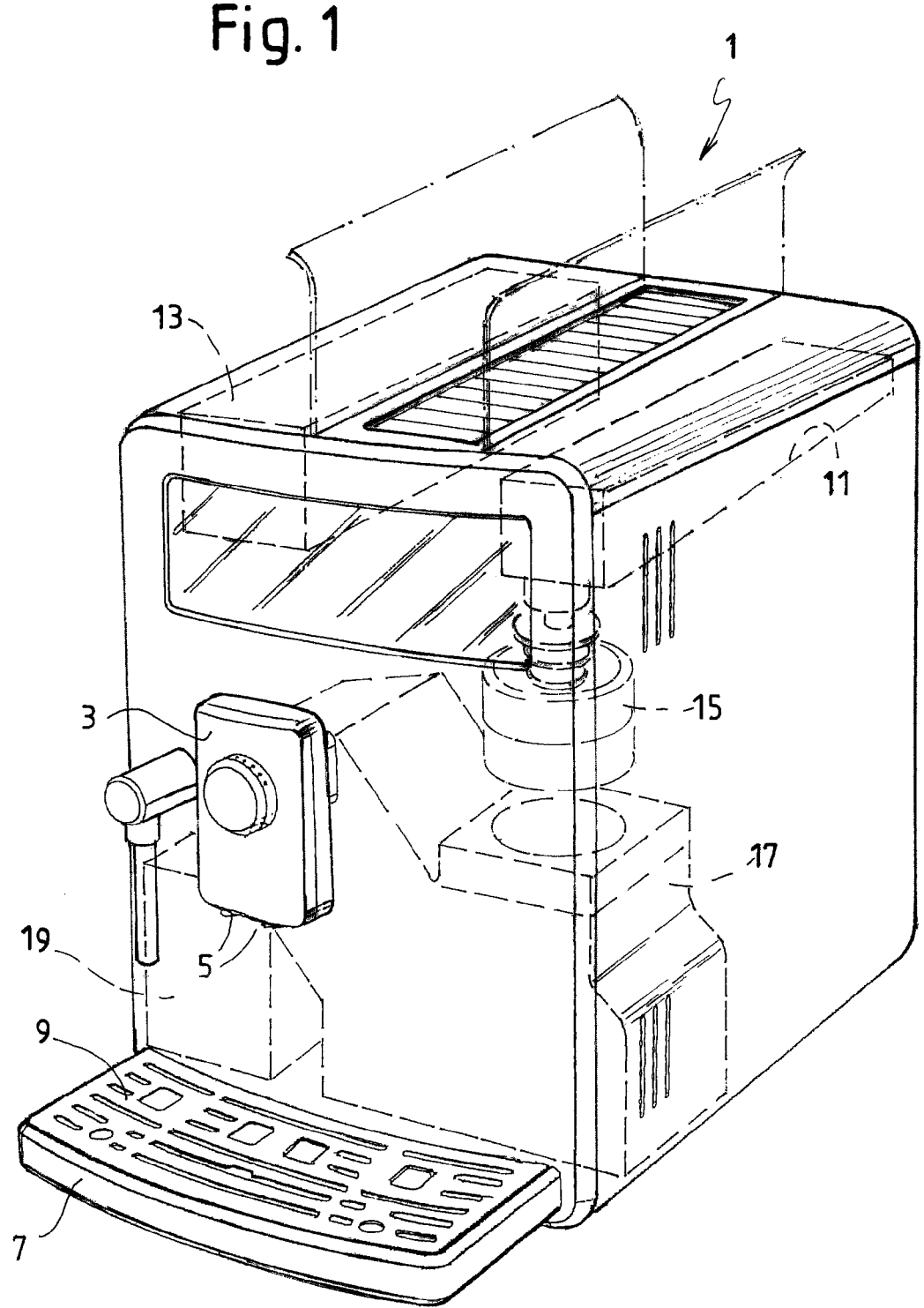
FIG. 1 illustrates a coffee machine with a brewing unit according to the present disclosure in one embodiment.

FIG. 1 illustrates a coffee machine globally labeled 1. The coffee machine comprises a coffee dispensing group 3 comprised of two coffee dispensing spouts 5. In other embodiments a single dispensing spout can be provided. Under the dispensing group 3 a drip collecting tray 7 closed by a grid 9 is arranged. The grid 9 forms a supporting surface for a cup, glass or other beverage container which the user can place under the spouts 5 to collect the coffee produced by the machine 1.

Figure 2:
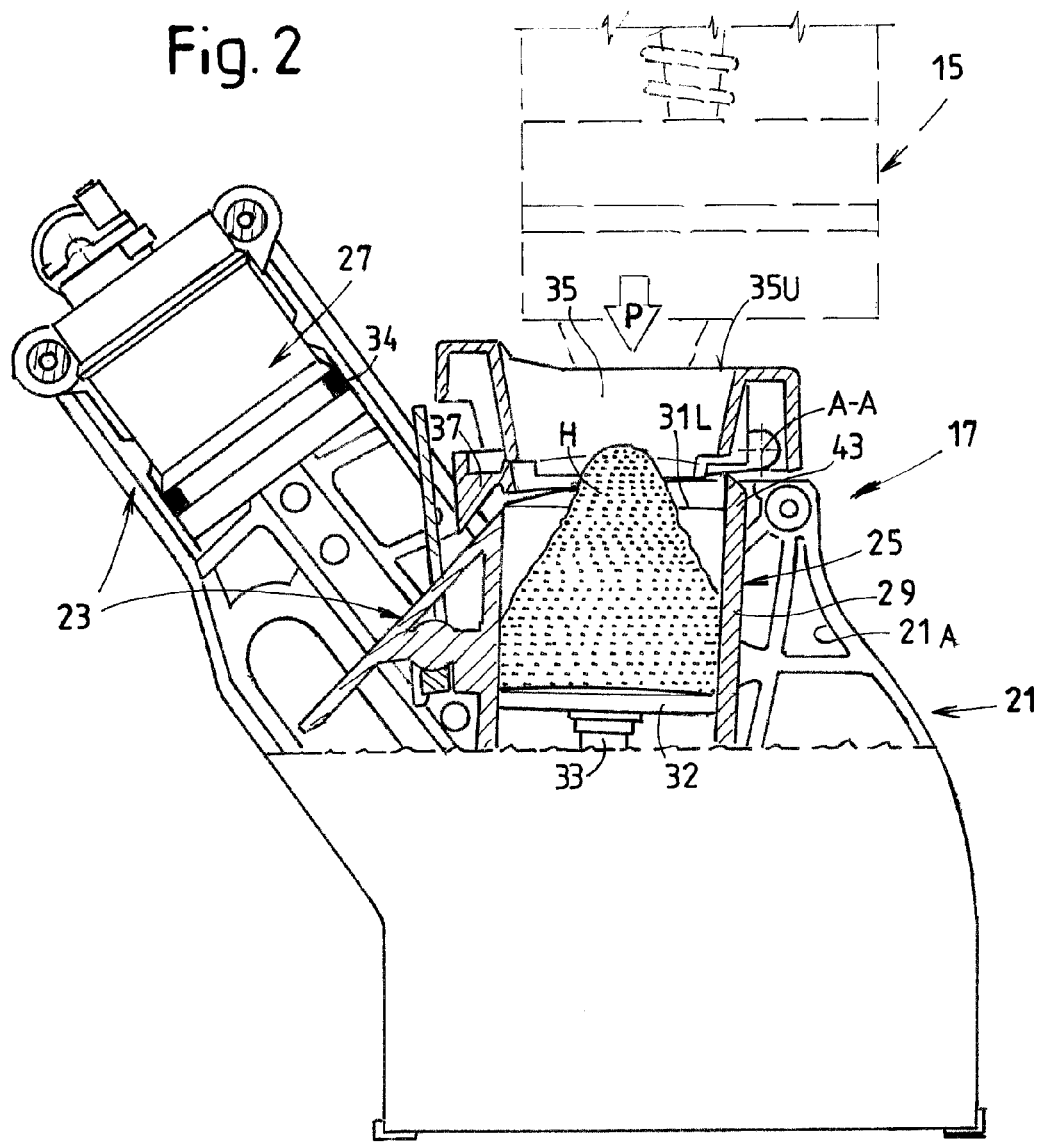
FIGS. 2 to 5 illustrate, in a sectional view according to a vertical plane, the closing movement of the brewing unit.
Figure 3:
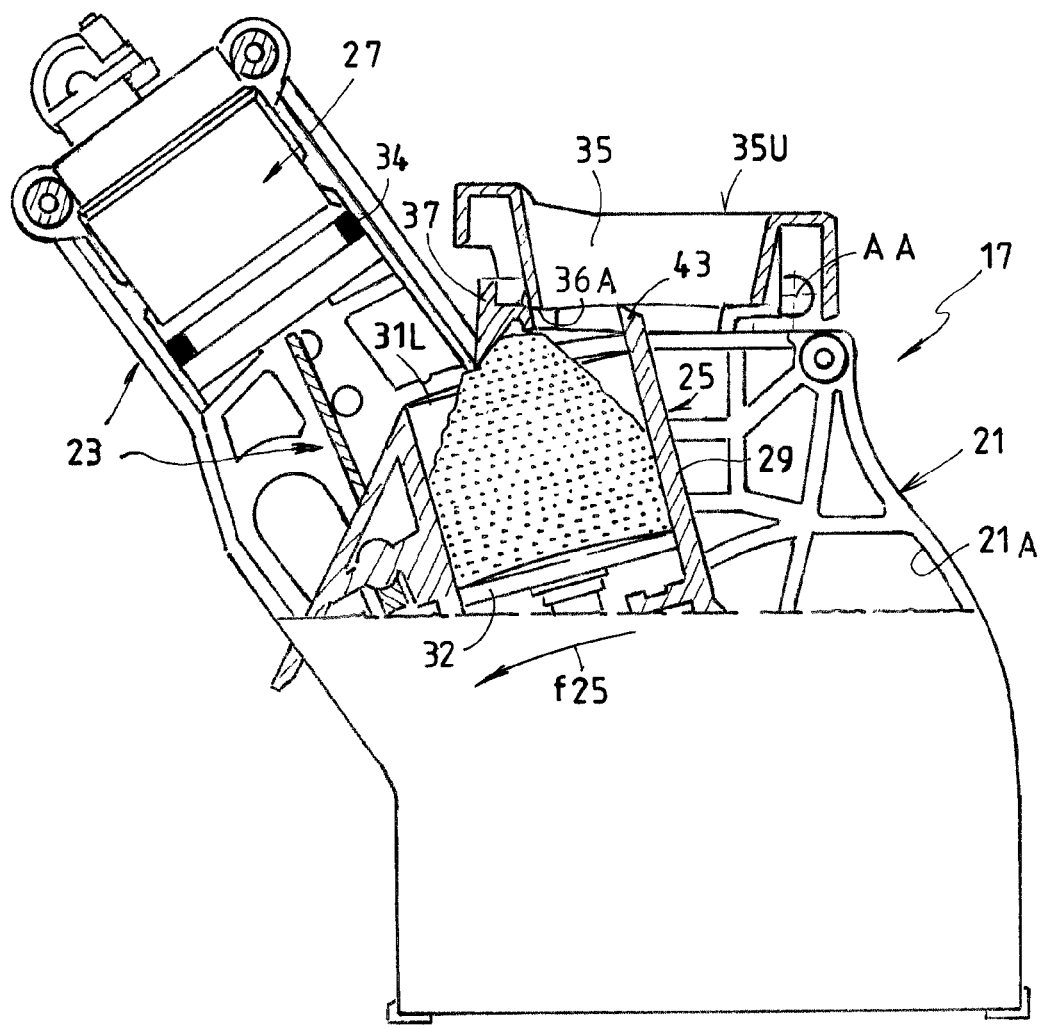

In the exemplary embodiment shown in FIG. 1, the coffee machine 1 also comprises a coffee bean container 11, a fresh water reservoir 13, a grinder 15, a brewing unit 17 and a receptacle 19 collecting the spent coffee powder discharged from the brewing unit 17, these components being schematically represented in FIG. 1; some of them will be described in greater detail reference being made to FIGS. 2 to 8. The coffee machine 1 also comprises a water pump and a water heater, not shown. The water pump delivers fresh water from the water reservoir 13 through the water heater and in the brewing unit 17. The brewing unit 17 is illustrated in FIGS. 2 through 8 and will be described in greater detail here below. FIG. 2 also schematically shows the coffee grinder 15 which is arranged above the brewing unit 17.

In the exemplary embodiment illustrated in the attached drawings the brewing unit 17 comprises a supporting structure 21, which supports an infusion chamber in the form of a brewing chamber. The supporting structure 21 comprises a pair of side panels 21A, only one of which is shown in FIGS. 2 through 5, the other panel being substantially identical and distanced therefrom forming a space between the two side panels 21A. The brewing chamber is arranged between the two side panels 21A.

The brewing chamber or infusion chamber is indicated with reference number 23. In some exemplary embodiments the brewing chamber 23 comprises a first brewing chamber portion 25, which is movable with respect to the supporting structure 21 under the control of a suitable actuator, for example an electric motor, known per se and not shown in the drawings. The movement of the first brewing chamber portion 25 is represented in the sequence of FIGS. 2 through 5 and will be described more in detail later on.

In some embodiments, the brewing chamber 23 further comprises a second brewing chamber portion 27. In the embodiment illustrated in the drawings the second brewing chamber portion 27 is supported in a fixed position by the supporting structure 21. In other embodiments the second brewing chamber portion 27 can be provided with a movement relative to the supporting structure 21, for example a rectilinear translation movement.

More in detail the first brewing chamber portion 25 comprises an outer component 29 defining an inner receptacle 31. The product for the preparation of the beverage, for instance coffee powder, is loaded in the inner receptacle 31. In some embodiments the inner receptacle 31 can have a generally cylindrical shape. The bottom of the receptacle 31 is closed by a movable piston 32 slidingly received in the outer component 29. The movable piston 32 is supported at the top end of a plunger 33. In some embodiments the plunger 33 can be axially hollow and form a hot water dispensing duct. The coffee beverage is dispensed through the second brewing chamber portion. In other embodiments, the plunger can form a coffee dispensing duct. In this case the hot water will be dispensed through the second brewing chamber portion.

The second brewing chamber portion 27 is substantially shaped as a closing piston, provided with an outer seal 34, for example an O-ring or a lip seal, slidingly and sealingly contacting the inner surface of the receptacle 31. Here below the second brewing chamber portion 27 will also referred to as upper piston 27.

Figure 4:
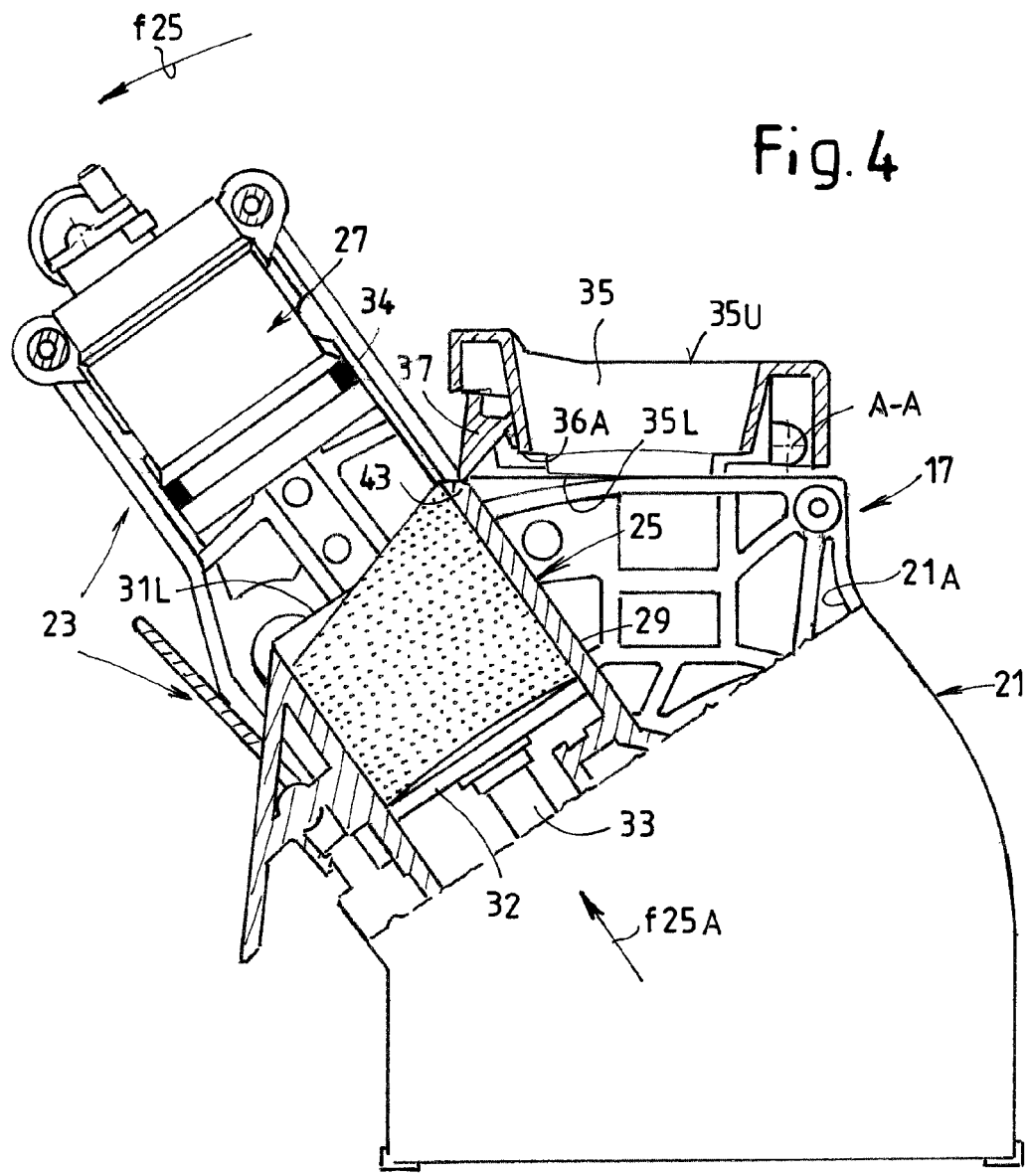
Figure 5:
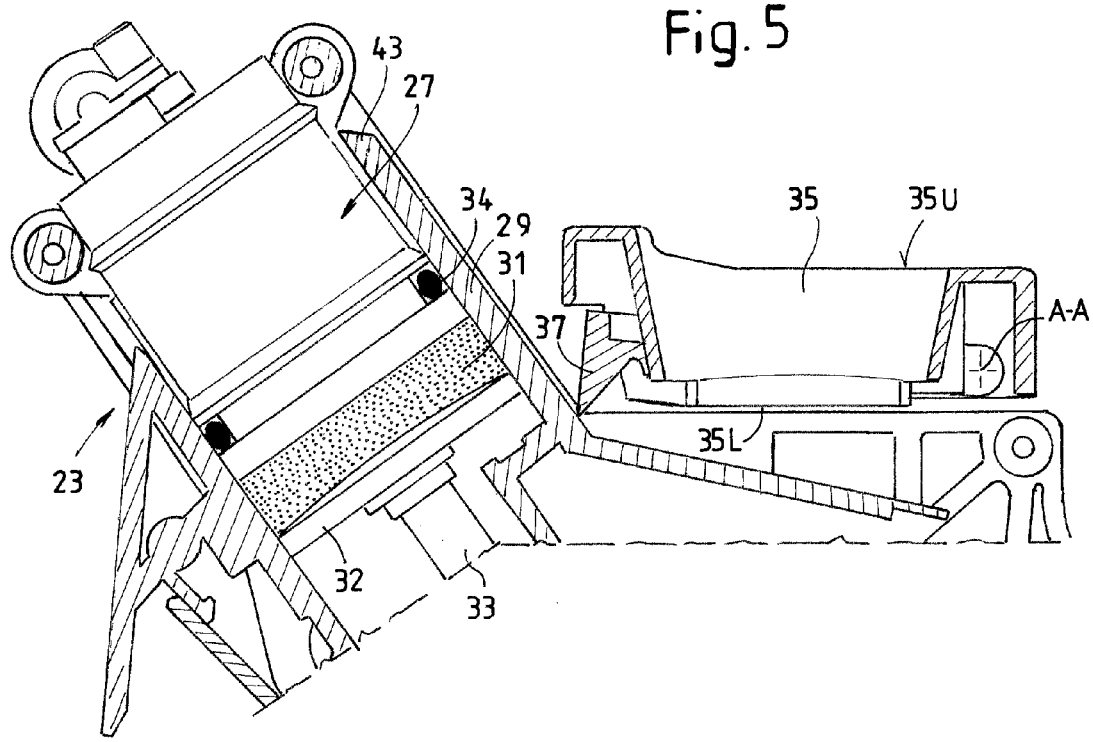

As can be appreciated from the sequence of FIGS. 2 to 5, the movable brewing portion 25 can take up a first loading position (FIG. 2) and move with a roto-translational movement from said first loading position to a final brewing position illustrated in FIG. 5.

In the first loading position the first brewing chamber portion 25 is arranged under a hopper 35 arranged between the supporting structure 21 and the coffee grinder 15 and through which the coffee powder produced by the grinder 15 is fed into the receptacle 31 of the first brewing chamber portion 25.

In the brewing position (FIG. 5) the second brewing chamber portion 27 is arranged in the receptacle 31 and brought near the piston 32 forming the bottom of the brewing chamber. A small space is left between the lower piston 32 and the upper piston 27 forming the second brewing chamber portion 27. The coffee powder collected in the first brewing chamber portion 25 is pressed and compacted between the piston 32 and the upper piston or second brewing chamber portion 27 to form a compact coffee powder bed or filter through which hot pressurized water flows, in order to extract the flavors from the coffee powder and produce the coffee-based beverage. In some embodiments the final volume available between the pistons 27 and 32 can be adjusted based on the amount of coffee powder, e.g to produce a stronger or lighter coffee, or else to produce one or two cups of coffee with one single brewing cycle.

The brewing unit disclosed so far and the brewing cycle performed by said brewing unit are known to those skilled in the art and require no further detailed description.

As can be appreciated from the sequence of movement illustrated in FIGS. 2 through 5, when the coffee powder is loaded (arrow P) through the hopper 35 into the receptacle 31, a heap H of coffee powder is formed inside the receptacle 31. The heap can usually be approximately conical. Under certain conditions, the tip of the heap H can project beyond thetop edge 31L surrounding the inlet opening of the receptacle 31. In other words, the height of the heap H is greater than the depth of the receptacle 31. This can depend not only upon the quantity of coffee powder loaded in the brewing chamber portion 25, but also upon the steepness of the conical heap, which in turn depends upon the physical properties of the powder. In order to remove the tip of the heap H and ensures that the entire coffee powder loaded is properly collected inside the receptacle 31, a scraper 37 is arranged near the hopper 35, so as to project under the lower outlet edge 35L of the hopper 35.

Figure 6:
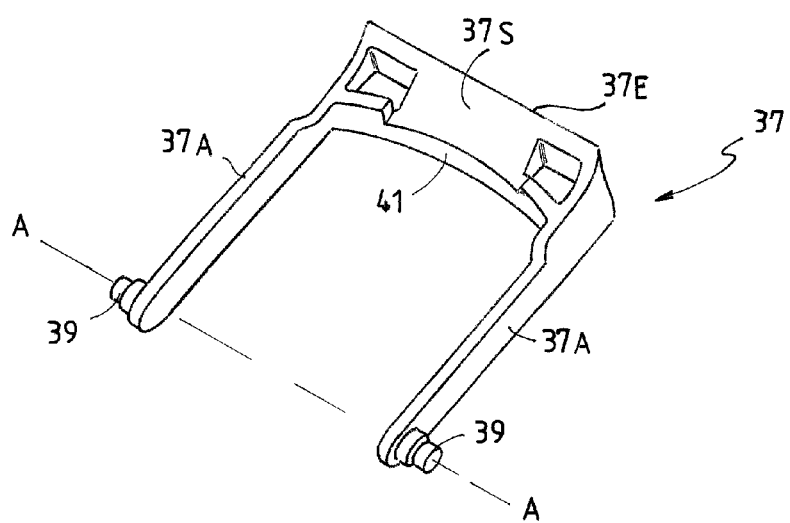
FIG. 6 illustrates a perspective view from the bottom of the scraper of the brewing unit.

The scraper 37 is illustrated in isolation in FIG. 6. In this embodiment the scraper 37 comprises two pivoting arms 37A. The pivoting arms 37 are provided with pivoting pins 39, by means of which the scraper 37 is swivelingly connected to the hopper 35. Resilient members, not shown, for example helical springs arranged around the pins 39, bias the scraper 37 towards a rest position, shown in FIG. 2. The rest position of the scraper 37 is defined by suitable abutments, for example formed by the supporting structure 21 and/or by the hopper 35.

During the movement of the first brewing chamber portion 25 from the first loading position of FIG. 2 towards the final brewing position of FIG. 5, the upper or top edge 31L surrounding the inlet aperture of the receptacle 31 pushes the scraper 37 causing the latter to pivot around a substantially horizontal axis A-A defined by the pivoting pins 39, overcoming the resilient thrust exerted by the resilient members, not shown.

In the exemplary embodiment shown in the figures, the scraper 37 is provided with a scraping edge 37E arranged at the distal ends of the pivoting arms 37A, i.e. at the end opposite the pivoting pins 39. In preferred embodiments the scraping edge 37E is substantially rectilinear and parallel to the pivoting axis A-A.

In the embodiment illustrated in the drawings, see in particular FIG. 6, in the intermediate portion thereof the scraping edge 37E merges with a pushing surface 37S. The surface 37S is preferably a concave surface, for example a ruled surface, such as a portion of a cylindrical surface. The surface 37S extends from the rectilinear scraping edge 37E toward a rib 41 spanning between the two pivoting arms 37A. In the exemplary embodiment shown in FIG. 6 the rib 41 is slightly curved, e.g.in the form of a portion of a circumference. The thickness of the rib 41, i.e. the dimension thereof in a direction orthogonal to the pivoting arms 37A, is variable along the development of the rib 41. More specifically, the intermediate portion of the rib 41 is thinner than the side portions thereof. The surface 37S extends along the intermediate portion of the rib 41 having the reduced thickness.

Figure 7:
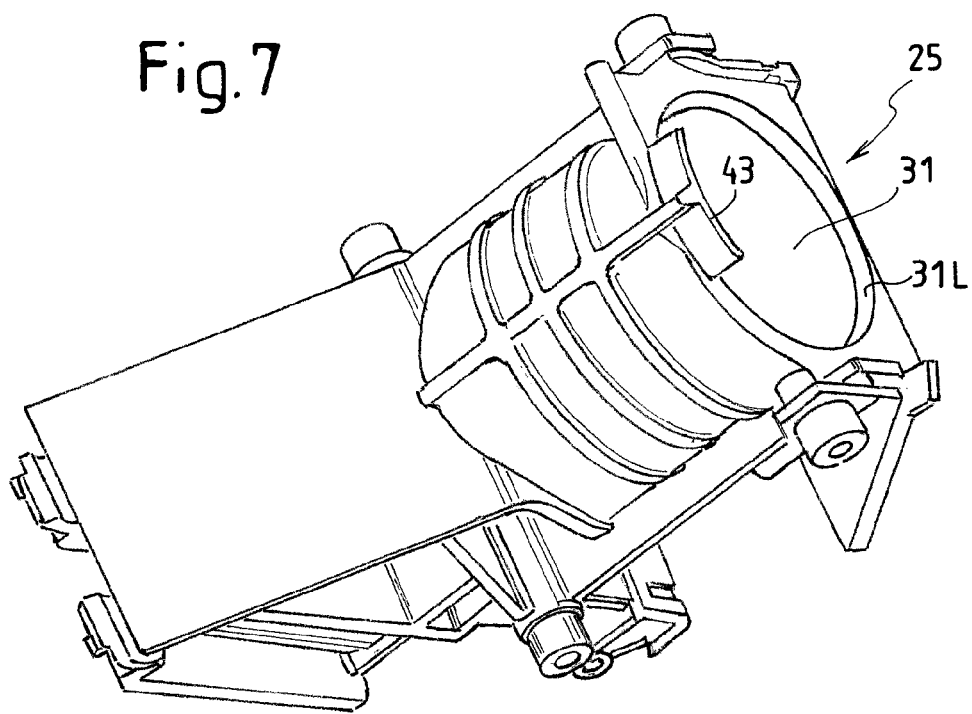
FIG. 7 shows a perspective view of the movable brewing chamber portion.

As can be noted in particular in FIG. 7, the first brewing chamber portion 25 forming the receptacle 31 is provided with a projection 43. The projection 43 extends from the top edge or annular edge 31L, which surrounds the inlet aperture of the receptacle 31 formed in the brewing chamber portion 25. The projection 43 develops along a portion of the top edge 31L, for example around an arc of approximately 20-40° of the substantially circular top edge 31L. In the embodiment illustrated in the drawings, the projection 43 is in the form of a portion of a substantially cylindrical surface projecting from the top edge 31L upwards, towards the hopper 35 when the first brewing chamber portion 25 is in its first, loading position (FIG. 2).

The top edge 31L surrounding the inlet of the receptacle 31 can be ideally divided into two symmetrical portions, e.g. according to a median line oriented orthogonal to the FIGS. 2 through 5, thus defining a leading portion and a trailing portion of the top edge 31L. The leading portion of the top edge 31L is the portion which, when the first brewing chamber portion 25 is in the loading position (FIG. 2), extends from the media line towards the left in the figure, i.e. towards the second brewing chamber portion 27. The trailing portion of the top edge 31L is the remaining portion of the top edge 31L.

The projection 43 is arranged in the trailing portion of the top edge 31L. The terms "leading portion" and "trailing portion" used to define the two portions of the top edge 31L are referred to the movement performed by the brewing chamber portion 25 when moving from the first, loading position (FIG. 2) towards the final, brewing position (FIG. 5) performing a rotary movement according to arrow f25 (FIGS. 3 and 4) towards the second brewing chamber portion 27. During this movement the top part of the first brewing chamber portion 25 and in particular the top edge 31L surrounding the inlet aperture of the receptacle 31 co-acts with the scraper 37. More specifically, the scraping edge 37E contacts the upper surface of the first brewing chamber portion 25 and slides along the top edge 31L. The scraper 37 is thereby pushed upwards and pivotally lifted by the first brewing chamber portion 25 moving thereunder. During this sliding motion, see in particular FIG. 3, the scraping edge 37E and the surface 37S will eventually impact against the tip of the coffee powder heap H collected in the receptacle 31 of the first movable brewing chamber portion 25. By continuing the movement (arrow f25) of the brewing chamber portion 25, the scraper 37 will level the heap H removing the tip thereof which will fall along the side surface of the heap towards the bottom of the receptacle 31.

The projection 43 extending upwardly beyond the top edge 31L is arranged in the trailing portion of the top edge 31L and will therefore be the last part of the movable brewing chamber portion 25 getting in contact with the scraper 37. The purpose of the projection 43 is to prevent the loose product forming the tip of the heap H to be pushed by the scraper 37 out of the receptacle 31. The projection 43 forms a sort of shield in the trailing part of the top edge 31L, which prevents the loose material forming the heap H from falling outside the receptacle 31 in the machine housing, where the brewing unit 17 is arranged.

As can be seen in FIG. 4, before losing contact with the first brewing chamber portion 25, the surface 37S and finally the scraping edge 37E of the scraper 37 will slide on the top of the projection 43. In FIG. 4 the scraper 37 has been pushed upwards and pivoted around axis A-A to an end position by the projection 43 passing beyond the scraping edge 37E. When the movement of the movable brewing chamber portion 25 continues from the position of FIG. 4 to the position of FIG. 5 performing a sliding movement according to arrow f25A, the scraper 37 will be maintained by the resilient members (not shown) associated therewith in sliding contact with the external surface of the first brewing chamber portion 25.

In order to get a better guidance of the coffee powder from the grinder 15 into the receptacle 41 formed inside the first brewing chamber portion 25, the hopper 35 develops vertically from an upper product inlet 35U towards a lower product outlet 35L defining a product path which ends in a position lower than the trajectory performed by the projection 43 when moving from the loading position of FIG. 2 towards the position of FIG. 4. In other words, the lower edge of the hopper 35, delimiting the product outlet 35L is placed in a position lower than the position taken by the projection 43 during the displacement thereof under the hopper 35.

Figure 8:
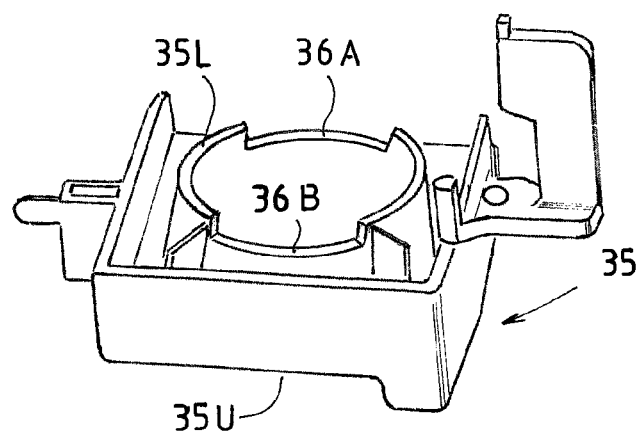
FIG. 8 illustrates a bottom view of the hopper through which the product is loaded in the receptacle of the movable brewing chamber portion.

To prevent collision between the projection 43 and the lower part of the hopper 35, the lower rim or edge thereof is provided with two indentations 36A and 36B shown in particular in the bottom view of FIG. 8. The two indentations 36A and 36B are aligned along the trajectory of the first brewing chamber portion 25, in order to allow the projection 43 to move underneath the hopper 35 without colliding with the lower edge or rim thereof.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A beverage producing unit, comprising:
an infusion chamber with a first infusion chamber portion forming a receptacle for receiving a product, said first infusion chamber portion being configured to be movable between a loading position, wherein the first infusion chamber portion is arranged under a product-loading hopper, and a brewing position, wherein said first infusion chamber portion is configured to co-act with a second infusion chamber portion of the infusion chamber to close said infusion chamber; and
a scraper configured to level a product heap of the product projecting from said receptacle during movement of said first infusion chamber portion from said loading position towards said brewing position,
wherein said receptacle has a top edge surrounding a receptacle inlet aperture of the receptacle, said top edge being provided with a projection extending a height of the receptacle at a first portion of said top edge towards the product-loading hopper and configured to prevent said product from falling out of the receptacle when passing under said scraper during the movement of said first infusion chamber portion from said loading position towards said brewing position, and wherein said projection extends the height of the receptacle at the first portion higher than a height of the receptacle at a second portion of the top edge.

2. The beverage producing unit according to claim 1, wherein said top edge has a leading portion and a trailing portion, said leading portion moving ahead of said trailing portion during the movement of said first infusion chamber portion from said loading position towards said brewing position, and wherein said projection is arranged along said trailing portion of the top edge.

3. The beverage producing unit according to claim 1, wherein said product-loading hopper has a product inlet, a product outlet and a product passage extending downwardly from the product inlet to the product outlet; wherein said product outlet is surrounded by an outlet edge; and wherein said outlet edge comprises two oppositely arranged indentations, aligned along a trajectory of motion of said first infusion chamber portion, said indentations being configured to allow passage of said projection extending from the top edge of said receptacle when said first infusion chamber portion moves under said product-loading hopper.

4. The beverage producing unit according to claim 1, wherein the scraper is configured to maintain contact with a surface of the first brewing chamber portion in the brewing position.

5. The beverage producing unit according to claim 1, wherein the first portion of the top edge is closer to the scraper when the first infusion chamber portion is in the brewing position compared to the second portion of the top edge which is farther from the scraper when the first infusion chamber portion is in the brewing position.

6. A beverage producing unit, comprising:
an infusion chamber with a first infusion chamber portion forming a receptacle for receiving a product, said first infusion chamber portion being configured to be movable between a loading position, wherein the first infusion chamber portion is arranged under a product-loading hopper, and a brewing position, wherein said first infusion chamber portion is configured to co-act with a second infusion chamber portion of the infusion chamber to close said infusion chamber; and a scraper configured to level a product heap of the product projecting from said receptacle during movement of said first infusion chamber portion from said loading position towards said brewing position, wherein said receptacle has a top edge surrounding a receptacle inlet aperture of the receptacle, said top edge being provided with a projection extending from said top edge and configured to prevent said product from falling out of the receptacle when passing under said scraper during the movement, and wherein said scraper is pivotally hinged for movement around a horizontal axis with respect to said product-loading hopper, said scraper being pivotally lifted by said first infusion chamber portion during the movement thereof from said loading position towards said brewing position.

7. The beverage producing unit according to claim 6, wherein the scraper is arranged near the product-loading hopper and configured to project under a lower edge of the product-loading hopper.

8. A beverage producing unit, comprising:

an infusion chamber with a first infusion chamber portion forming a receptacle for receiving a product, said first infusion chamber portion being configured to be movable between a loading position, wherein the first infusion chamber portion is arranged under a product-loading hopper, and a brewing position, wherein said first infusion chamber portion is configured to co-act with a second infusion chamber portion of the infusion chamber to close said infusion chamber; and a scraper configured to level a product heap of the product projecting from said receptacle during movement of said first infusion chamber portion from said loading position towards said brewing position, wherein said receptacle has a top edge surrounding a receptacle inlet aperture of the receptacle, said top edge being provided with a projection extending a height of the receptacle at a first portion of said top edge and configured to prevent said product from falling out of the receptacle when passing under said scraper during the movement, wherein said projection extends the height of the receptacle at the first portion higher than a height of the receptacle at a second portion of the top edge, and wherein said scraper comprises a lower scraping edge and a sliding surface configured to co-act with said projection during the movement of said first infusion chamber portion from said loading position towards said brewing position.

9. A beverage producing unit, comprising:

an infusion chamber a first infusion chamber portion forming a receptacle for receiving a product, said first infusion chamber portion being configured to be movable between a loading position, wherein the first infusion chamber portion is arranged under a product-loading hopper, and a brewing position, wherein said first infusion chamber portion is configured to co-act with a second infusion chamber portion of the infusion chamber to close said infusion chamber; and a scraper configured to level a product heap of the product projecting from said receptacle during movement of said first infusion chamber portion from said loading position towards said brewing position, wherein said receptacle has a top edge surrounding a receptacle inlet aperture of the receptacle, said top edge being provided with a projection extending from said top edge and configured to prevent said product from falling out of the receptacle when passing under said scraper during the movement, wherein said scraper comprises a lower scraping edge and a sliding surface configured to co-act with said projection during the movement of said first infusion chamber portion from said loading position towards said brewing position, and wherein said sliding surface is concave.

10. The beverage producing unit according to claim 9, wherein said lower scraping edge is rectilinear.

11. The beverage producing unit according to claim 9, wherein said sliding surface is located between two ends of said lower scraping edge, said sliding surface extending for only one part of a longitudinal extension of said lower scraping edge and developing from said lower scraping edge towards a horizontal axis of the scraper up to a transverse rib, the horizontal axis being horizontal with respect to said product-loading hopper.

12. The beverage producing unit according to claim 11, wherein said transverse rib has a central portion with a reduced thickness, wherein the sliding surface merges with said transverse rib at the central portion, and wherein the transverse rib has terminal portions with a larger thickness larger than the reduced thickness, said terminal portions projecting beyond said sliding surface, said central portion being arranged in alignment with a displacement trajectory of said projection.

* * * * *